United States Patent [19]
Onley et al.

[11] Patent Number: 6,018,335
[45] Date of Patent: *Jan. 25, 2000

[54] PROGRAMMABLE KEYBOARD AND METHOD THEREFOR

[75] Inventors: Raymond V. Onley; Alan R. Hannan, both of Cincinnati, Ohio

[73] Assignee: KDI Precision Products, Inc., Cincinnati, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/914,329

[22] Filed: Aug. 19, 1997

[51] Int. Cl.[7] .................................................. G09G 3/26
[52] U.S. Cl. .............................. 345/172; 341/22; 345/168
[58] Field of Search ..................................... 345/158, 156, 345/157, 174, 172, 168, 169; 341/20, 22, 23, 176; 364/231; 705/18, 25

[56] References Cited

U.S. PATENT DOCUMENTS

| | | | |
|---|---|---|---|
| 4,200,913 | 4/1980 | Kuhar et al. | 341/23 |
| 4,280,121 | 7/1981 | Crask | 345/174 |
| 4,763,252 | 8/1988 | Rose | 345/168 |
| 4,823,311 | 4/1989 | Hunter et al. | 345/172 |
| 4,916,740 | 4/1990 | Noda et al. | 341/23 |
| 4,937,778 | 6/1990 | Wolf et al. | 345/168 |
| 4,964,075 | 10/1990 | Shaver et al. | 341/23 |
| 5,119,479 | 6/1992 | Arai et al. | 345/156 |
| 5,121,472 | 6/1992 | Danish et al. | 364/231 |
| 5,144,567 | 9/1992 | Oelsch et al. | 341/23 |
| 5,197,147 | 3/1993 | Long et al. | 364/228 |
| 5,241,646 | 8/1993 | Arai | 364/234 |
| 5,287,526 | 2/1994 | Wolf et al. | 345/172 |
| 5,305,449 | 4/1994 | Ulenas | 345/163 |
| 5,317,505 | 5/1994 | Karabed et al. | 345/156 |
| 5,363,296 | 11/1994 | Fuyama | 705/18 |
| 5,404,321 | 4/1995 | Mattox | 345/172 |
| 5,414,426 | 5/1995 | O'Donnell et al. | 341/76 |
| 5,485,614 | 1/1996 | Kocis et al. | 345/168 |
| 5,493,654 | 2/1996 | Gopher et al. | 341/22 |
| 5,504,483 | 4/1996 | Hoffmann et al. | 341/22 |
| 5,559,512 | 9/1996 | Jasinski et al. | 341/22 |
| 5,576,734 | 11/1996 | Daniele et al. | 345/168 |

*Primary Examiner*—Dennis-Doon Chow
*Attorney, Agent, or Firm*—Harness, Dickey & Pierce, PLC

[57] ABSTRACT

An apparatus adapted to be coupled between a keyboard and a computer to enable a user to define desired keys as coded keys which are associated with MACROS defined by the user. The apparatus includes a microcontroller and an electrically erasable, programmable read only memory (EEPROM) which monitors codes transmitted from the keyboard and is placed in a programming mode when a predetermined program code is received from the keyboard. Once in the program mode, the next key depressed by the user is denoted as a coded key and the following keys depressed by the user are designated as a user programmed MACRO associated with the coded key. The apparatus stores this information in the EEPROM and thereafter when the coded key is depressed by the user the associated MACRO is generated and transmitted to the computer. The apparatus forms a very compact, relatively inexpensive means for enabling conventional keyboards to function as programmable keyboards. In an alternative preferred embodiment, editing and creation of the MACROS can be accomplished by receiving information from the computer through the use of a software program which enables the user to more conveniently enter and exit the programming mode, as well as make necessary edits to previously stored MACROS.

7 Claims, 4 Drawing Sheets

PROGRAMMABLE KEYBOARD AND METHOD THEREFOR

BACKGROUND OF THE INVENTION

1. Technical Field

This invention relates to devices for programming computer keyboards, and more particularly to a device which enables virtually any computer keyboard to perform as a programmable keyboard by enabling a user to program selected keys of the keyboard to denote MACROs representing pluralities of frequently used user commands.

2. Discussion

Programmable keyboards have become generally available in recent years for use with a wide variety of computer systems, and particularly with personal computers. Such programmable keyboards generally permit a user to "program" a selected, particular key of the keyboard to represent a plurality or string of individual keystrokes, typically referred to as a "MACRO", representing various functions and/or commands. This can significantly enhance the productivity of the user by allowing the user to enter commands when using the computer and/or software running on the computer, via a single keystroke, where such commands may otherwise require multiple keystrokes to invoke.

Until the present time, such programmable keyboards have often been relatively expensive and/or somewhat cumbersome to program. In some instances, a programmable keyboard designed for one particular type of computer may not be entirely compatible with computers of a wide variety of manufacturers. Accordingly, there exists a need for a simple, relatively low cost apparatus for enabling virtually any computer keyboard to be turned into a "programmable" keyboard.

SUMMARY OF THE INVENTION

The above and other objects are provided by an apparatus and method in accordance with the present invention for permitting a user to program frequently used keystroke sequences (MACROs) to correspond to selected keys of a computer keyboard. The apparatus comprises a controller and a memory device and is coupled in between an output of a computer keyboard and the keyboard port of a computer, such as a personal computer.

The controller senses when the user has entered a predetermined keystroke sequence indicating that a programming mode is to be entered. At this point, the controller treats the next key entered by the user as a code key, and the keys following thereafter as the plurality of keys, that is, the MACRO, that will be associated with the code key. The controller also detects when a predetermined series of keystrokes has been entered which represents a command to the controller to store the MACRO immediately following the code key and to exit the programming mode. In this manner the user is able to designate selected keys of the keyboard as each being representative of a programmed MACRO. Each MACRO may be representative of a command, file name, etc. or any other operation or keystroke sequence which is used frequently by the user. Thereafter, when the user presses one of the keys of the keyboard which has been programmed as a code key, the MACRO associated with the selected code key is generated by the apparatus and transmitted to the computer.

The method of the present invention involves defining a command to enter a programming mode as well as a command to exit the programming mode. The keyboard is monitored and if the start programming command is detected, then the next keystroke entered by the user is designated as a code key. The keystrokes following the code key are designated as the MACRO which corresponds to that particular code key, and which will be generated if the user presses the key which has been designated as the code key during use of the keyboard. The method also involves detecting the command to exit the programming mode.

In an alternative preferred embodiment the apparatus and method of the present invention responds to a software program which provides a display which can be generated on a video monitor of a computer to provide a visual indication to the user of the keys of the keyboard which have been programmed as code keys and the MACRO's associated with each code key. In this manner, if the user is running a program, such as a spread sheet, and wishes to immediately modify one previously defined code key, the user can merely select the program via a floating window on the monitor, which then displays the MACRO. The user can then make the edits needed. The ability to be used with a computer program to facilitate editing of MACROs enables the present invention to operate as a very user friendly system and to be invoked quickly and easily should minor edits be needed to re-program the code keys.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
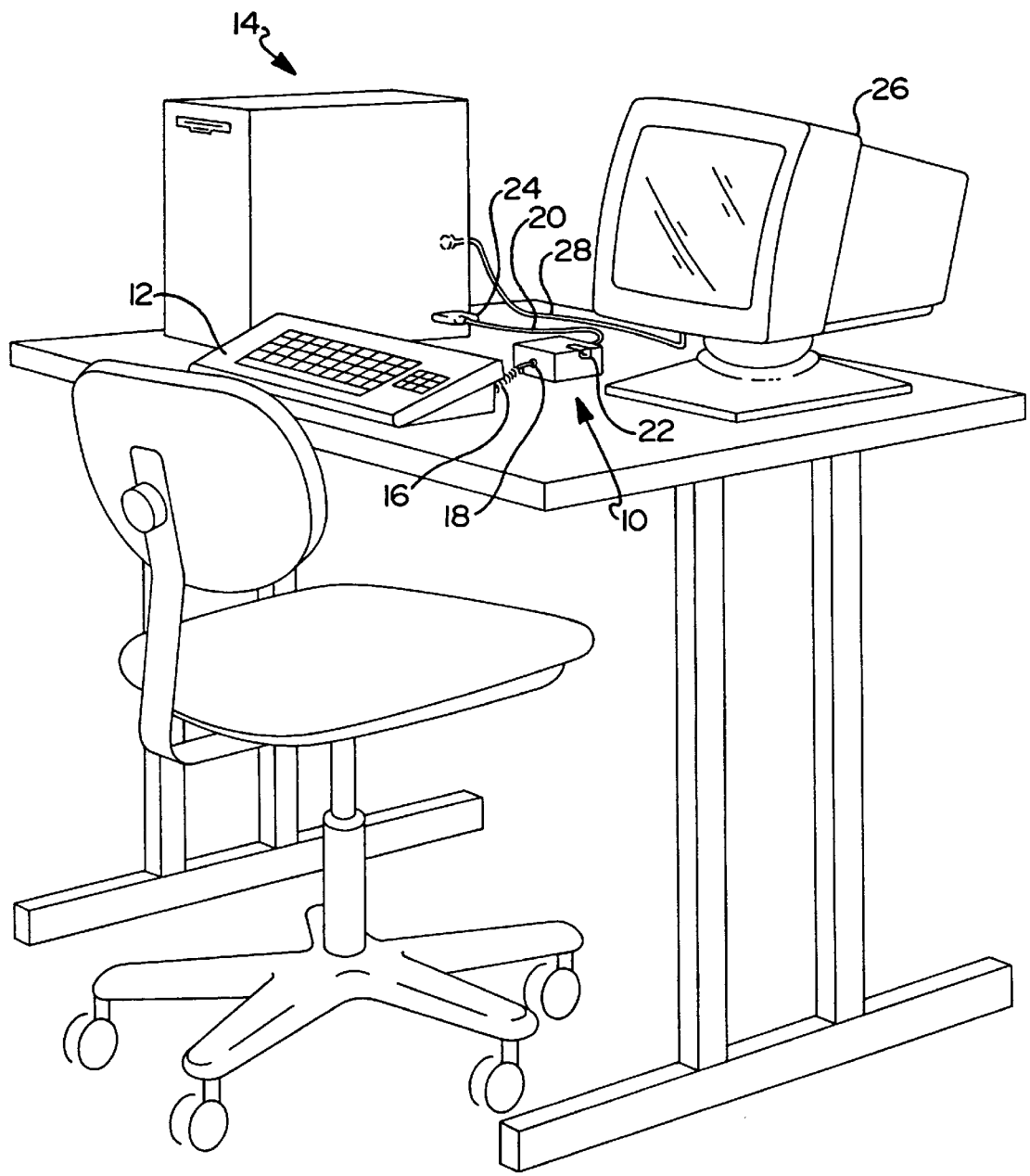
FIG. 1 is a perspective view of the apparatus of the present invention coupled between a computer keyboard and a computer having a video monitor.

Referring to FIG. 1, there is shown an apparatus 10 in accordance with the present invention coupled serially in between a computer keyboard 12 and a computer 14. The apparatus 10 is coupled to a keyboard cord 16 via a port 18 and to the computer 14 via a separate keyboard cord 20 coupled to a port 22 at the rear of the apparatus 10. The other end of the keyboard cord 20 is coupled to a port 24 at the rear of the computer 14. The computer 14 is also coupled to a video monitor (i.e., a CRT) 26 via a separate cable 28.

Figure 2:
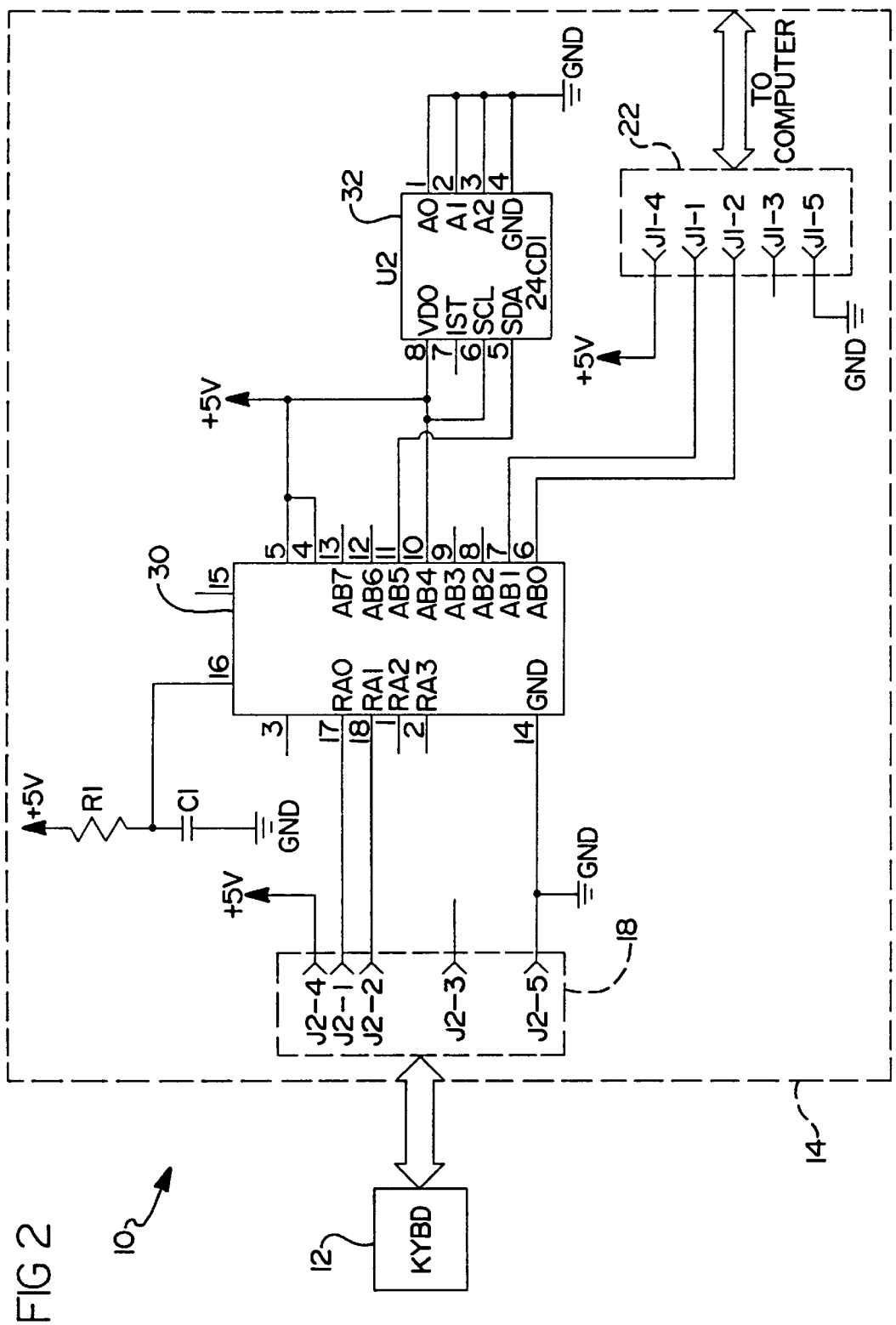
FIG. 2 is a simplified electrical schematic diagram of the apparatus of FIG. 1.

With reference to FIG. 2, the apparatus 10 generally includes, in addition to the ports 18 and 22, a microcontroller 30 having on-board RAM and electrically erasable programmable read only memory (EEPROM) 32. The microcontroller 30 operates at a frequency of preferably about four MHZ and the EEPROM 32 provides preferably at least about 256 bytes of storage. Accordingly, the apparatus 10 is relatively inexpensive to construct and can be manufactured to form a very compact module having a relatively small footprint. Thus, the apparatus 10 does not require a large surface area for support and can be positioned on a desk top or a computer stand without interfering with the placement of the video monitor 26 or the keyboard 12.

Figure 3:
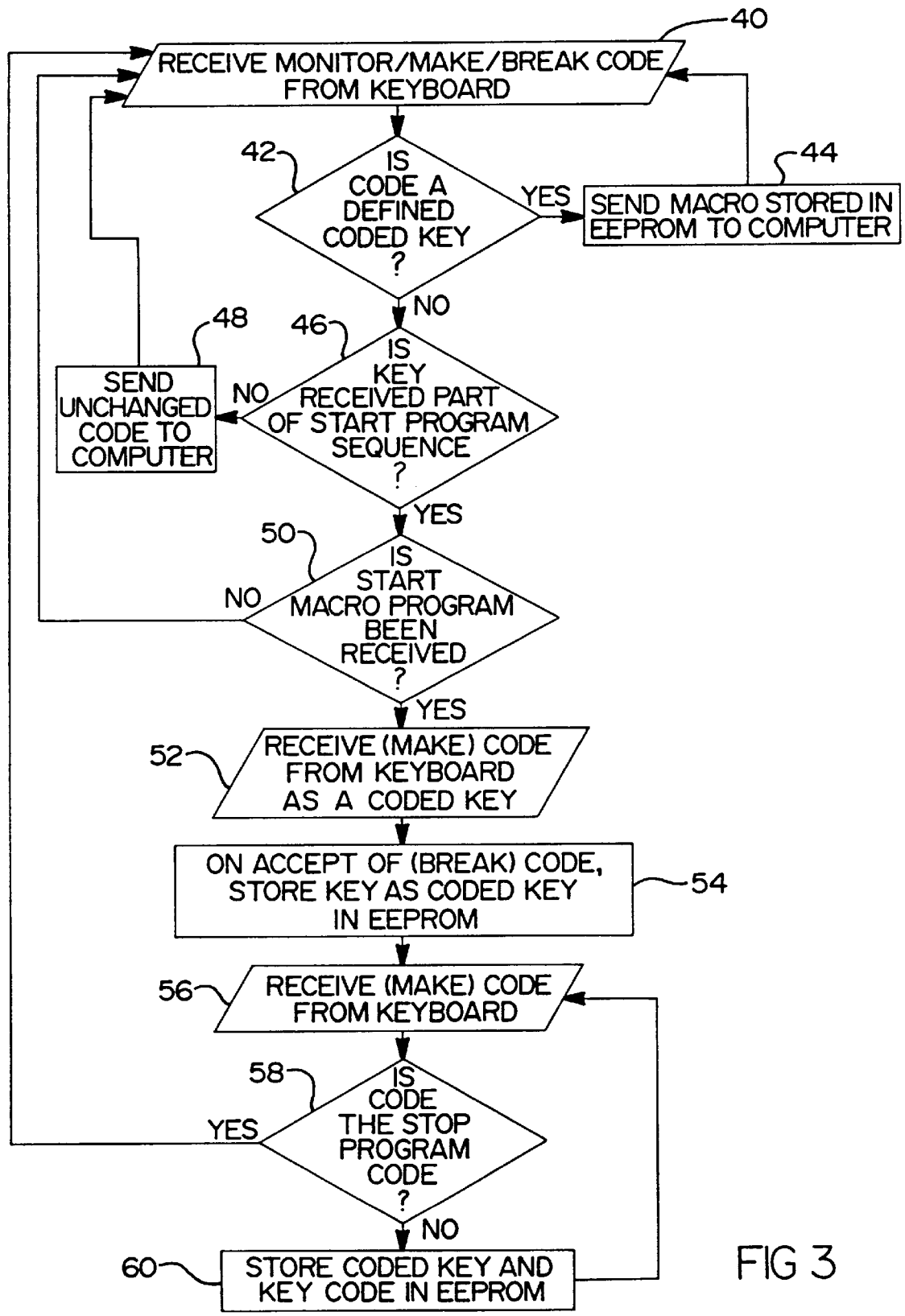
FIG. 3 is a flowchart illustrating the steps of the method of the present invention.

Referring to FIG. 3, the method of the present invention will now be described. In general, however, it will be understood that the apparatus 10 and its method of operation, in a first preferred embodiment, operates to monitor codes sent from the keyboard 12 and to detect when a programmed key, also referred to herein as a "code" key, has been depressed by the user, and further to implement a MACRO stored by the user for that particular code key. In this manner the apparatus 10 enables a command or function which would otherwise require several keystrokes to be generated with just one keystroke from the user.

Referring to FIG. 3, the apparatus 10 monitors the codes transmitted from the keyboard 12 as the user presses various keys thereof, as indicated at step 40. Each time a key of the keyboard 12 is pressed, a "MAKE" code is generated by the keyboard 12 corresponding to that particular key which has been depressed. When the key is released, a "BREAK" code is also generated by the keyboard 12. Several MAKE codes may be generated from the keyboard 12, for example, by pressing the "SHIFT", "CONTROL" and "DELETE" keys at the same time.

Whenever a MAKE code is received a check is made, as indicated at step 42, to determine if the code defines a coded key. A coded key is a key that has been previously programmed by the user to represent a MACRO. The method of the present invention contemplates recognizing and acting on MAKE codes but, it will be appreciated, that an arrangement where BREAK codes are acted upon could just as readily be implemented. Thus, the method of the present invention is not limited strictly to recognizing MAKE codes or BREAK codes.

With further reference to FIG. 3, if the MAKE code is detected as representing a coded key, then the controller 30 retrieves the MACRO stored in association with the detected MAKE code from the EEPROM 32 and transmits the programmed codes to the computer 14, as indicated at step 44.

If the check at step 42 indicates that the MAKE code received does not correspond to a coded key, then a check is made, as indicated at step 46, to determine if the received MAKE code is the first MAKE code of a predetermined "Start Program" code sequence. The predetermined Start Program code sequence is a code sequence programmed into the RAM of the microcontroller 30 which designates that a program mode is to be entered in which the user will be permitted to program a key from the keyboard 12 as a code key to represent a user-defined MACRO. If the answer at step 46 is "no", then the MAKE code received is sent to the computer, as indicated at step 48. The apparatus 10 then continues to monitor the codes generated from the keyboard 12, as indicated at step 40.

If the check made at step 46 produces a "yes" answer, indicating that the code received is the first code of a Start Program sequence, then a check is made at step 50 to determine if the entire Start Program code sequence has been received. It will be appreciated that the Start Program code could be preprogrammed as a single MAKE code, such as the code generated when a single, particular key is depressed. It is believed that in most instances, however, it will be more preferable to require the user to depress two or more keys (and thus to generate two or more MAKE codes in sequence) to enter the programming mode to prevent the programming mode from being accidentally entered.

If the inquiry of step 50 produces a "no" answer, then the apparatus 10 continues to monitor the keyboard 12, as indicated at step 40, and checks to determine if the next code received is that of a coded key, as indicated at step 42 and, if not, checks to see if the next code received is part of the Start Program code sequence, as indicated at step 46. Only when all of the codes corresponding to the Start Program code sequence have been received in the proper sequence will the inquiry at step 50 produce a "yes" answer, in which case the apparatus 10 will enter the program mode. In the program mode, the next key depressed (and its corresponding MAKE code generated thereby) will be monitored by the microcontroller 30, as indicated at step 52, and upon receipt of a BREAK code, the just released key will be designated as a coded key and its MAKE code stored in the EEPROM 32, as indicated at step 54. The next MAKE codes received from the keyboard 12 are monitored by the apparatus 10, as indicated at step 56, and a check is made, as indicated at step 58, to determine if a predetermined Stop Program code is received. The predetermined Stop Program code is preferably one or more predetermined MAKE codes, one or more predetermined BREAK codes or a predetermined combination of MAKE and BREAK codes generated by the keyboard 12 when the user presses one or more keys. It will be appreciated that the user will be apprised of which key or keys (and what sequence if two or more keys are to comprise the Start Program or Stop Program codes) will involve a Start Program or Stop program code through a user's or operator's manual provided with the apparatus 10. When the Stop Program code is received by the microcontroller 30 it exits the program mode and stores the just received codes. If no Stop Program code is received, the microcontroller 30 stores the just-received MAKE code in the EEPROM 32 and continues to receive additional MAKE codes which are input by the user, as indicated at step 56, until the Stop Program code is detected at step 58. When the Stop Program code is detected the programming mode is exited, the just-received codes stored in the EEPROM 32, and the apparatus 1 0 then continues to monitor the MAKE and BREAK codes from the keyboard as indicated at step 40.

The above arrangement allows the user to program specific keys of the keyboard 12 to correspond to used-defined MACROs, each representing commands or functions which would otherwise require several keystrokes to initiate. Accordingly, a user can initiate various functions and commands simply by pressing an associated key. It will be appreciated that the principal limit on the number of MACROs which can be stored to correspond to single coded keys is limited principally by the amount of memory available.

Figure 4:
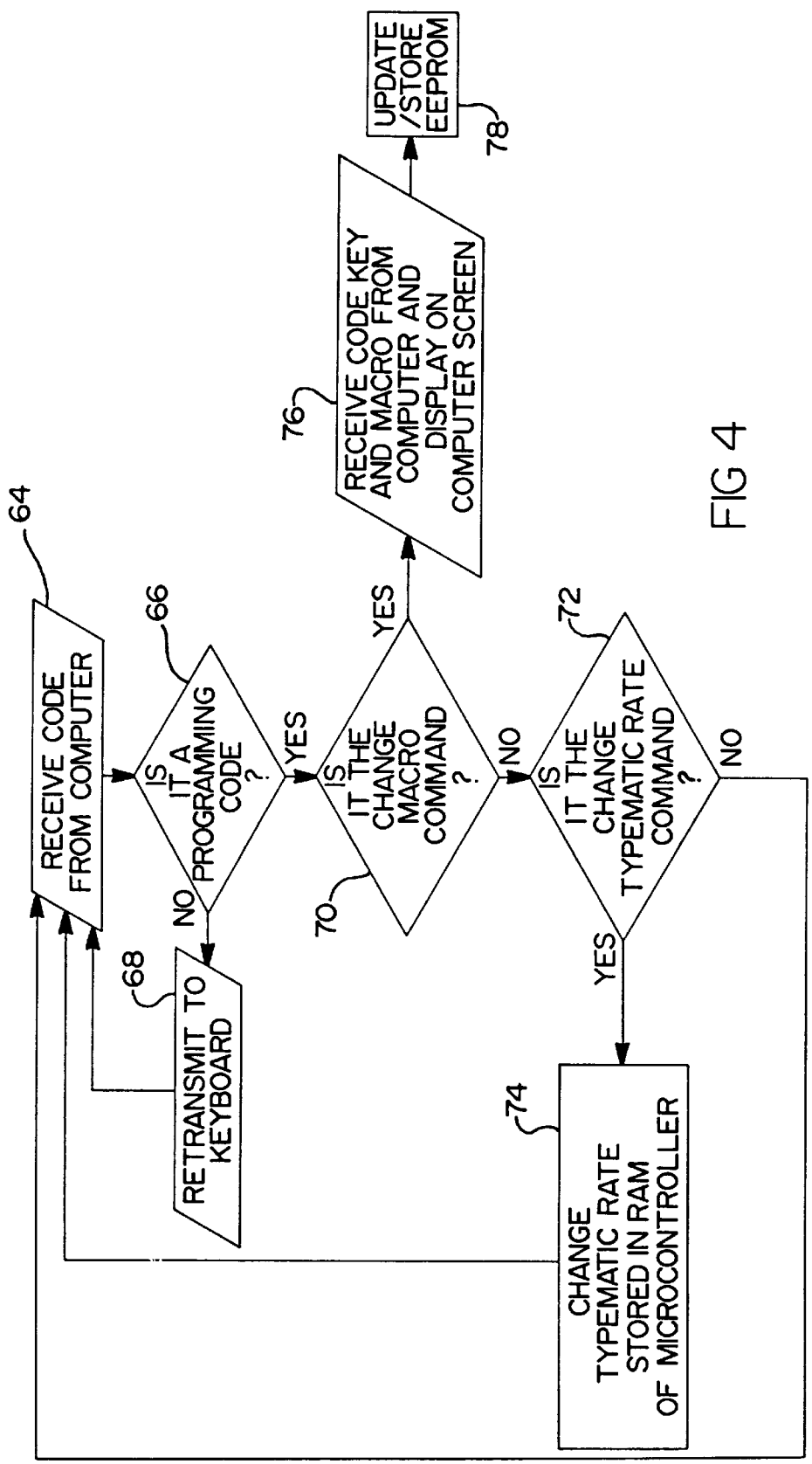
FIG. 4 is a flowchart of the steps of operation of editing the programmed keystrokes associated with an existing programmed code key from the computer rather than through the keyboard.

Referring now to FIG. 4, a software program is illustrated which enables the user to program keys of the keyboard from the monitor 26 by viewing suitable prompts and other user-friendly inquiries which may be displayed by selecting a pop-up window on the screen of the monitor 26, and invoked by the user to make edits to already programmed MACROs. Accordingly, it will be appreciated that, in this instance, the codes being received are from the computer 14 rather than from the keyboard 12.

Referring then to FIG. 4, the apparatus 10 monitors the codes received from the computer 14, as indicated at step 64, to determine if the received code is a predetermined programming code. If not, the code is transmitted to the keyboard 12, as indicated at step 68. If so, a check is made, at step 70, to determine if the code is a predetermined code indicating that an existing MACRO is to be edited. If not, a check is made, as indicated at step 72, to determine if the code is a "change typematic rate" code indicating that the typematic rate is to be changed or some other form of code. If the inquiry at step 72 produces a "yes" answer, then the typematic rate stored in the RAM of the controller 30 is changed, as indicated at step 74. In this regard it will be appreciated that the feature of monitoring and modifying the typematic rate is not essential to the implementation of the present invention. The typematic rate, as will be appreciated by those in the art, is the rate at which the MAKE and BREAK codes are transmitted between the keyboard 12 and computer 14. If the inquiry at step 72 produces a "no" answer, then the apparatus 10 continues to monitor the codes received from the computer 14, as indicated at step 64.

If the inquiry at step 70 indicates that a code has been received indicating that a MACRO is to be edited, then a program or edit mode will be entered, as indicated at step 76. In step 76, the controller 30 receives the coded key and edited MACRO from the computer 14, as input by the user from the keyboard 12, and the program on the computer displays the information on the monitor 26. The controller 30 then stores/updates the information in the EEPROM 32, as indicated at step 78. Thus, the edits are made with the aid of the monitor 26. The software program can be written specifically for any operating system including DOS®, Windows®, OS/2®, etc.

The apparatus and method of the present invention thereby enables MACROs to be defined and edited through the use of an independent, relatively inexpensive module, thus eliminating the need for modifications to the keyboard itself to perform as a programmable keyboard. The apparatus and method the present invention forms a generally low cost arrangement for enabling various keys of a computer keyboard to function as programmable keys to save time in entering frequently used commands, which would otherwise require several keystrokes by the user.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An apparatus for use with a computer and an existing computer keyboard associated with said computer, and inserted serially inbetween said keyboard and said computer, for storing and executing programmed keystroke sequences, said apparatus comprising:

a computer program adapted to recognize a start programming code generated by depressing a first predetermined key of such existing keyboard, wherein said first predetermined key represents a command to initiate a MACRO programming sequence;

said computer program further being adapted to recognize an end program code generated by depressing a second predetermined key of said existing keyboard, wherein said second predetermined key represents a command to end said MACRO programming sequence;

a controller in communication with said keyboard and responsive to said computer program, said controller being responsive to said start programming code entered by a user at said existing keyboard to signal the start of said MACRO programming sequence in which at least one user selected key of said existing keyboard is defined by said user to represent a plurality of keystrokes, said plurality of keystrokes representing a user command, and said controller further being responsive to said end program code to signal the end of said MACRO programming sequence; and a memory for storing a first code corresponding to said selected key and a plurality of second codes corresponding to said plurality of keystrokes such that said controller recalls said second codes from said memory when said user selects said selected key and transmits said second codes representing said plurality of keystrokes to said computer from said existing computer keyboard.

2. The apparatus of claim 1, further comprising a computer program adapted to be run on said computer for communicating with said keyboard to permit said second codes to be edited through the use of said computer.

3. An apparatus for use with a computer and an existing computer keyboard and being adapted to be coupled between said computer and said computer keyboard for enabling programming of selected keys of said keyboard to denote pluralities of frequently used keystrokes, said apparatus comprising:

a microcontroller in communication with said keyboard and said computer, said microcontroller being responsive to a first programming code entered by a user at said keyboard to signal to said microcontroller the start of a programming mode in which at least one key selected by said user is defined by said user to represent a MACRO corresponding to a plurality of keystrokes;

a program associated with said microcontroller for enabling editing of said MACRO from a video monitor coupled to said computer and for recognizing predetermined keys of said keyboard as indicating that said programming mode is to be entered, said program further being responsive to a second programming code indicating that said programming mode is to be terminated;

a memory for storing said MACRO for said selected key; and said microcontroller operating to retrieve said stored MACRO from said memory and to transmit said MACRO to said computer when said user selects said selected key from said keyboard.

4. The apparatus of claim 3, wherein said computer program discriminates between a first code representing said selected key and a plurality of second codes different from said first code.

5. The apparatus of claim 3, wherein said programming mode can be entered from said keyboard by said user entering said programming code and from said computer program by said user.

6. A method for programming and using at least one selected key of an existing computer keyboard to represent a MACRO representing a plurality of keys of said keyboard such that pressing said selected key causes said MACRO to be transmitted directly to a keyboard input port of a computer, without otherwise interfering with the transmission of information from said keyboard input port of said computer, said method comprising the steps of:

defining a first key from said keyboard to represent a start program code;

defining a second key from said keyboard to represent an end program code;

reading keystroke information output from said keyboard to determine if said start program code has been generated by said user depressing said first key from said keyboard;

if said start program code has been generated, monitoring signals output from said keyboard to determine a subsequent key which is depressed and designating said subsequent key as a code key;

continuing to monitor said keyboard and designating keys depressed subsequent to receipt of said code key as a MACRO associated with said code key;

continuing to monitor said keyboard and detecting when said user presses at a said second key corresponding to said end program code;

when said key corresponding to said end program code has been detected, exiting said program mode and storing said MACRO in a memory;

monitoring key code information being transmitted to said computer to detect the activation of said code key and, when said user selects said code key, generating said MACRO automatically and transmitting said MACRO to said computer; and continuing to monitor key code information transmitted to said computer.

7. The method of claim 6, further comprising the step of:

editing said MACRO via a program and a video monitor operably coupled to said computer.

* * * * *